United States Patent [19]

Rogers et al.

[11] 4,023,584
[45] May 17, 1977

[54] FRANGIBLE VALVED FITTING

[75] Inventors: Russell L. Rogers, Munith; Richard A. Buseth, Jackson, both of Mich.

[73] Assignee: Aeroquip Corporation, Jackson, Mich.

[22] Filed: Sept. 5, 1975

[21] Appl. No.: 610,625

[52] U.S. Cl. .......................... 137/68 R; 137/614.03; 285/2
[51] Int. Cl.² ........................................ F16K 17/40
[58] Field of Search ............................ 137/68–71, 137/797; 285/2–4; 403/2

[56]  References Cited

UNITED STATES PATENTS

| | | | |
|---|---|---|---|
| 2,994,280 | 8/1961 | Daffin | 285/2 X |
| 3,427,047 | 2/1969 | Mayo | 285/3 |
| 3,630,214 | 12/1971 | Levering | 285/3 X |
| 3,719,194 | 3/1973 | Anderson | 137/68 R |
| 3,797,510 | 3/1974 | Torres | 137/68 R |
| 3,913,603 | 10/1975 | Torres | 137/68 R |

Primary Examiner—Martin P. Schwadron
Assistant Examiner—Richard Gerard
Attorney, Agent, or Firm—Beaman & Beaman

[57]  ABSTRACT

A valved fluid coupling having tubular halves interconnected by frangible means. Each half includes a self-closing valve located in its passage and the valves are maintained in an open position by supports and retainers which sense the coupling connected state. Upon fracture of the connection means the halves separate permitting the valve retainers to release the valves closing the body passages. The frangible connection means takes the form of a rib formed upon one half overlapped by a projection defined on the other half having a retainer engaging the rib. Axial forces of a predetermined value on the halves cause the rib to fracture. Also, frangible means are disclosed for permitting valve half separation under radial shear forces and a sealing boot may be used to minimize fluid loss upon coupling disengagement.

14 Claims, 5 Drawing Figures

FRANGIBLE VALVED FITTING

BACKGROUND OF THE INVENTION

The invention pertains to the field of valved interconnected fluid couplings having frangible or "breakaway" connection means.

In the fluid handling arts, particularly in pressurized hydraulic systems, fluid couplings are employed to interconnect hose, pipes, conduits and tank mounted fittings, and the like. In some applications it is desired that, for safety reasons and to prevent extensive hose or conduit damage, the coupling halves disengage upon being subjected to predetermined axial or shear forces. Such operation is desirable, for instance, in the aircraft industry in fuel lines and other fluid lines to minimize fuel loss and fire hazard in the event of a crash.

Fluid couplings utilizing frangible connections employ valves adapted to close on disengagement of the coupling halves. Such valves may be biased by springs, and/or by the fluid within the associated hose or conduit, and are usually of the poppet, sliding or pivoted type. An example of such coupling is shown in U.S. Pat. No. 3,719,194 and in the assignee's application Ser. No. 441,242, filed Feb. 11, 1974.

One of the problems with known frangible connections for fluid couplings arises from the difficulty in assembling the coupling and maintaining close control over the forces necessary to separate the coupling bodies. As shown in U.S. Pat. No. 3,719,194, frangible connections usually take the form of defining a weakened portion in a connecting sleeve or utilize shear pins. Such structure is usually relatively bulky and distracts from the exterior coupling configuration if it is desired that the coupling be as concise in dimension as possible and having a smooth pleasing appearance free of handles, sharp edges and pin ends.

Further, known frangible couplings utilizing shear pins do not provide a uniform assembly pressure and resistance to coupling half separation throughout the periphery of the coupling, and known devices utilizing frangible connection means require a plurality of components resulting in high material and manufacturing costs.

BRIEF DESCRIPTION OF THE INVENTION

It is an object of the invention to provide a frangible fluid coupling which is of concise dimension having an exterior configuration free of protrusions and extraneous configurations wherein the coupling halves are maintained in engagement by connection means producing uniform forces throughout the coupling circumference.

Another object of the invention is to provide a valved fluid coupling of the frangible breakaway type wherein a minimum of components are utilized in the frangible connection and wherein the coupling may be manufactured and assembled with a minimum of expense.

Another object of the invention is to provide a frangible valved fluid coupling utilizing a mounting flange in the connection means wherein disconnection of the coupling halves occurs under either predetermined axial or radial forces and wherein a sealing boot is utilized to minimize fluid loss upon coupling disconnection.

In the practice of the invention the coupling halves each include a valve which is normally biased toward a closed position. However, each coupling half includes a valve retainer which holds the associated valve in the open position when the coupling halves are interconnected by the frangible connection means. Upon the connection means fracturing the valve retainers permit the valves to pivot the closed positions with a minimum loss of fluid from the coupling.

The frangible connection includes an annular rib homogeneously defined upon one of the coupling halves and the other coupling half includes a telescoping lip or projection superimposed over the rib which receives a drive wire directly engaging the rib to prevent separation of the coupling halves.

The use of the annular frangible rib, and the drive wire, assures a substantially uniform engagement between the rib and wire throughout the circumference of the coupling and a sealing O-ring is located adjacent the rib to establish a fluid seal between the coupling halves.

In a variation of the invention the frangible coupling structure includes a mounting flange in which a pair of drive wires are mounted cooperating with the frangible rib defined upon each coupling half. Further, radial or shear forces imposed upon the coupling transverse to the coupling axis will separate the halves as a weakened or frangible section is defined in the flanged connection adjacent the flange. Such weakened connection takes the form of radial slots interconnected by webs defined in the connection means adjacent the intersection of the flange and associated hub.

In the aforementioned embodiment wherein the connection means includes a mounting flange, the increased distance of separation between the coupling halves valve supports is spanned by a flexible boot which prevents any significant escape of fluid during separation of the coupling halves.

In the practice of the invention, the fact that the frangible rib is formed of the material of its associated body half substantially simplifies the construction of the frangible components and the utilization of the drive wire permits an effective interconnection between the coupling bodies utilizing easily manufactured components of low cost.

BRIEF DESCRIPTION OF THE DRAWINGS

The aforemention objects and advantages of the invention will be apparent from the following description and accompanying drawings wherein.

DESCRIPTION OF THE PREFERRED EMBODIMENTs

Figure 1:
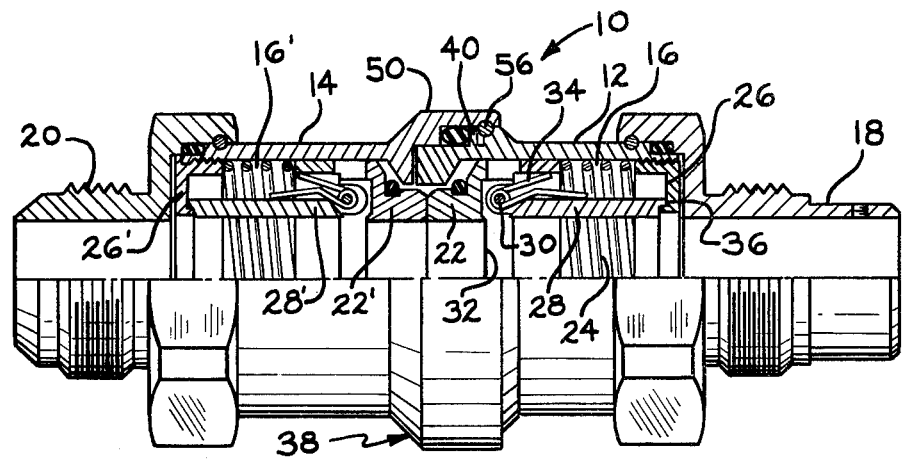
FIG. 1 is an elevational view, the upper half being shown in diametrical section, of a fluid coupling constructed in accord with the invention wherein the coupling halves are interconnected.

A fluid coupling employing the inventive concepts of the invention is shown in FIG. 1 wherein a fluid coupling 10 consists of two separate tubular bodies or halves 12 and 14 interconnected at their ends. The halves 12 and 14, except for the frangible connection structure, are substantially similar and similar components are identified by primed reference numerals.

Each tubular coupling half includes a cylindrical passage 16 and the half 12 has a threaded fitting 18 affixed thereto at its outer end, while the half 14 has the threaded fitting 20 attached to its outer end. The fittings are attached to their associated body end in a conventional fluid tight manner such as by a drive wire and O-ring.

Each coupling half includes an annular valve support 22 axially movable within its associated passage. Each support is biased toward the connection end of its half by a compression spring 24 bearing against a valve retainer 26 threaded within the associated passage. A pivoted valve 28 is mounted upon each support upon a pivot pin 30 and is biased toward a closed position in engagement with a valve seat 32 defined upon the support by a torsion spring 34. The valve 28 is held in an open position by a lip 36 which rests upon a lip defined upon the retainer 26.

When the valve halves 12 and 14 are interconnected the supports 22 and 22' thereof engage, as shown in FIG. 1, to maintain the valves 28 and 28' upon the retainers and hold the valves in the open position. Thus, a fully open free flowing passage is defined through the coupling 10.

If the frangible connection means of the coupling is fractured permitting separation of the halves 12 and 14 the springs 24 bias the supports 22 toward the inner end of the halves permitting the valve lips 36 to be removed from the retainers 26, and the valves 28 quickly pivot to a closed position on seats 32 sealing the associated passage. The aforementioned valve structure and operation is identical to that described in the assignee's application Ser. No. 441,242, filed Feb. 11, 1974.

The coupling halves are maintained in an interconnected relationship by connection means 38. This connection means includes an annular frangible rib 40 defined upon coupling half 12 formed homogeneously of the material thereof. The coupling half 12 further includes an enlarged annular shoulder-defining radially projecting portion 42 having a drive wire seat 44 defined thereon and an O-ring receiving surface 46 cooperates with an O-ring 48 to seal the valve halves with respect to each other.

The coupling half 14 includes an annular sleeve or projection 50 having an inner diameter 52 permitting the projection to telescope over the rib 40, and the projection includes an annular groove 54 and a hole tangential thereto, not shown, whereby the drive wire 56 may be inserted into the projection to form a circular configuration within the groove.

To assemble the coupling halves 12 and 14 the halves are axially aligned and related in the position shown in FIG. 1 wherein the projection 50 overlaps the rib 40 and the groove 54 is aligned with the surface 44. The drive wire 56 is then inserted into the projection 50 and is of such diameter as to engage the edge of the rib 40 and the surface 44. In this manner the drive wire and rib prevents the coupling halves from being separated and engagement of the drive wire with the surface 44 further axially positions the coupling halves with respect to each other.

Figure 2:
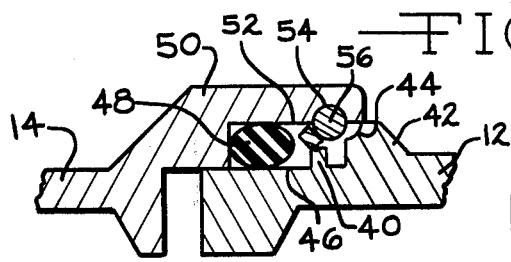
FIG. 2 is an enlarged sectional detail view of the connection means of the embodiment of FIG. 1 illustrating the relationship of components immediately after fracturing of the rib.

Conduits, such as flexible hose lines, not shown, are attached to the fittings 18 and 20, and in the event that excessive tension forces are imposed on the hose lines and the coupling halves, the drive wire 56 will tend to bend the outer edge of the rib 40 to the left, FIGS. 1 and 2, and upon such axial forces reaching a predetermined value the rib will fracture, FIG. 2, permitting the coupling halves to separate. As such separation occurs the valve supports 22 move away from their associated valve retainer 26 and the valves 28 close with little loss of fluid.

As the rib 40 is homogeneously formed of the material of the coupling half 12, and as the drive wire 56 is of an economical construction, it will be appreciated that the aforedescribed frangible connection is of an economical construction which may be employed in a concise coupling with a minimum of components and does not require external projections.

Figure 3:
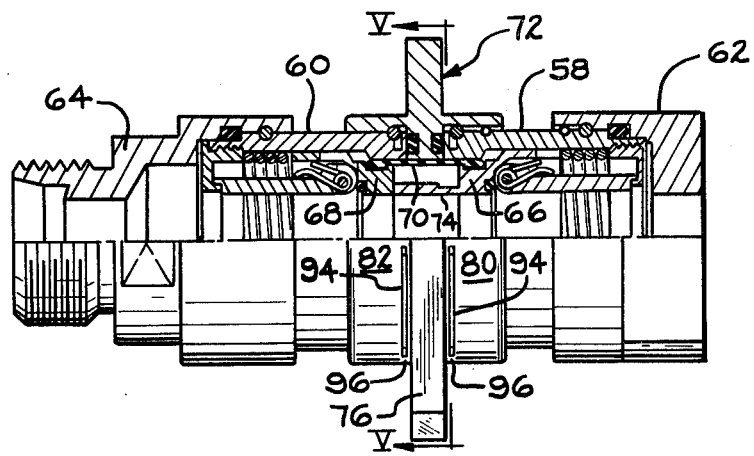
FIG. 3 is an elevational partially diametrically sectioned view of an embodiment of fluid coupling in accord with the invention utilizing a mounting flange defined upon the connection means.

The coupling embodiment illustrated in FIG. 3 includes a pair of coupling halves 58 and 60, the half 58 having the fitting 62 attached thereto, while the coupling half 60 includes the fitting 64. Internally, the half 58 includes an annular valve support 66 while the half 60 includes support 68. Each of the valve supports includes a pivoted valve biased by a compression spring and the valves are held in the open position by an annular retainer in a manner identical to that described with respect to FIG. 1.

The valve supports 66 and 68 are each provided with an annular groove on their periphery and an annular boot 70 includes an enlarged bead at each end received within a respective groove, whereby the boot seals the passage between the coupling halves 58 and 60 in the region of the connector, generally indicated at 72.

The connector 72 is interposed between the inner ends of the coupling halves and the resultant spacing between the halves produces a spacing between the supports 66 and 68. The support 66 includes a pair of projections 74, FIGS. 3 and 5, defined thereon which axially extend toward and engage support 68, to maintain the valve supports in the desired position when the coupling halves are interconnected.

Figure 4:
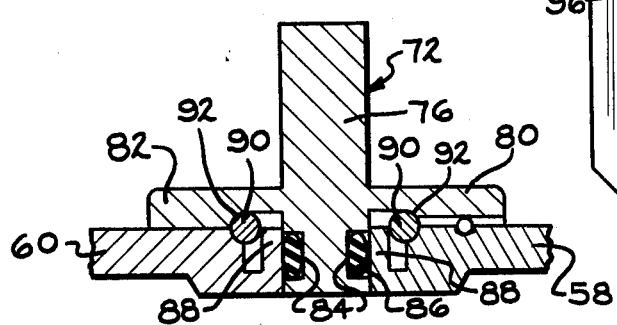
FIG. 4 is an enlarged detail sectional view of the connection means of FIG. 3.
Figure 5:
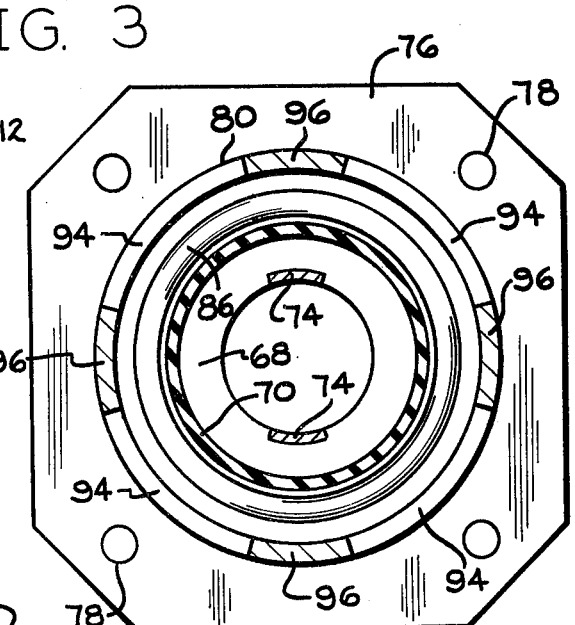
FIG. 5 is an elevational sectional view taken along section V—V of FIG. 3.

As apparent from FIGS. 3 and 4, the connection means 72 includes a mounting flange 76 radially extending with respect to the axis of the coupling, and includes mounting holes 78, FIG. 5, through which bolts or other fasteners may be used to mount the flange to a tank wall, for instance. The flange includes cylindrical hub portions 80 and 82 which axially extend from the flange, having an inner diameter which permits the end portions of the halves 58 and 60 to be inserted into the hubs as will be apparent from FIG. 4. The hub includes grooves 84 for receiving the O-rings 86 to establish a sealed relationship with the coupling halves ends.

Each of the coupling halves ends is provided with an annular radially extending rib 88, which cooperates with the drive wires 90 mounted within the hubs. Arcuate annular recess surfaces 92 are defined within the hubs for cooperation with the drive wires whereby insertion of the drive wires, and the cooperation thereof with the surfaces 92 and the associated rib 88, axially positions the coupling halves, as apparent in FIG. 3.

The aforedescribed embodiment permits fracturing of the connection means 72 upon predetermined radial or shear forces being imposed upon the connection means. Such fracturing is facilitated by a plurality of radially extending slots 94 defined in the connection means adjacent the intersection of the flange 76 and the hubs 80 and 82, FIGS. 3 and 4. The slots are separated by webs 96 as will be apparent from FIG. 5.

The presence of the slots 94 weakens the hub 80 adjacent the flange 76 whereby the imposing of a radial or shear force upon either of the coupling halves will permit the webs 96 defined in the hub to shear. As the slots and webs are in substantial alignment with the inner end of the coupling halves, such shearing action is not resisted by interference between the coupling components and, as the coupling halfs are displaced in the event of such shearing, the valves will pivot to the closed position as soon as the supports 66 and 68 are sufficiently separated to shift and permit the valves to close.

Axial forces imposed upon the coupling embodiment of FIGS. 3-5 above a predetermined value will cause a fracturing of one or both of the ribs 88 permitting separation of the coupling halves as described with respect to the embodiment of FIGS. 1 and 2.

It will be appreciated that in a frangible fitting in accord with the invention the fact that the frangible rib is fractured will prevent the coupling from being reassembled without the replacement of the coupling half upon which the rib is formed. Thus, a frangible fitting in accord with the invention will normally only be utilized in those situations wherein the coupling provides a safety function, such as in fuel line use in aircraft, or other instances wherein the likelihood of the connection fracturing is remote. However, as the construction of the frangible connection does not deteriorate with age, provides a uniform circumferential assembly force, and will effectively maintain a sealed connection between the coupling halves for indefinite periods of time, a frangible coupling in accord with the inventive concepts meets the desired requisites.

It is appreciated that various modifications to the inventive concepts may be apparent to those skilled in the art without departing from the spirit and scope of the invention.

We claim:

1. A frangible valved fluid coupling comprising, in combination, a tubular body having an axis, an exterior surface, an inlet end, an outlet end and defining a fluid passage, an elongated, frangible radially extending rib defined on said body extending from said exterior surface about the circumference thereof and located adjacent one of said ends, a valve within said passage, a connecting member located adjacent said one end affixed to said body having an extending portion superimposed over said rib, and a retainer mounted in said extending portion engaging said rib on the opposite side thereof with respect to said one end maintaining said connecting member upon said body, said retainer causing said rib to fracture upon the existence of a predetermined axial force tending to separate said member and body.

2. In a frangible fitting as in claim 1 wherein said rib is homogeneously formed of the material of said body.

3. In a frangible fitting as in claim 2 wherein said rib is of a circular configuration and said connecting member extending portion is of a circular transverse cross section.

4. In a frangible fitting as in claim 3 wherein said retainer comprises a drive wire inserted into said extending portion.

5. A frangible connection for fluid couplings comprising, in combination, a first coupling member having an axis and a circular portion, a second coupling member having an axis and a circular portion adapted to telescope over and receive said first circular portion, an annular radially extending frangible rib homogeneously defined on one of said portions radially extending toward the other portion, a retainer mounted on the other portion engaging said rib maintaining the assembly of said portions whereby a predetermined axial force tending to separate said portions causes said retainer to fracture said rib permitting said portions to separate.

6. In a frangible connection for fluid couplings as in claim 5 wherein said retainer comprises a wire inserted into said other portion.

7. In a frangible connection for fluid couplings as in claim 6 wherein said rib is of circular configuration and said retainer comprises a drive wire having a circular configuration and engaging said rib substantially throughout its circumferential length.

8. A frangible valved fluid coupling comprising, in combination, first and second tubular bodies adapted to be interconnected, a passage defined in each body, a valve defined in each body within the associated passage movable between open and closed positions, a movable releasable valve support within each body selectively maintaining the associated valve in its open position, each of said bodies having an interconnectible end and a fluid conducting connecting end, frangible connection means mounted upon said bodies interconnectable ends maintaining said bodies in end-to-end relationship, abutment means interposed between said valve supports maintaining said supports in valve open positions upon said bodies being interconnected by said connection means whereby separation of said bodies releases said supports causing said valves to move to their closed positions, and an annular flexible boot in radial alignment with said connection means interconnecting said supports and defining a portion of the passage between said bodies, said boot minimizing fluid leakage upon disconnection of said bodies upon release of said connection means.

9. In a fluid coupling as in claim 8 wherein said valve supports each include an annular portion located adjacent the associated body interconnectible end, and said abutment means comprises at least one projection integrally defined on one of said annular portions engaging the other annular portion when said bodies are interconnected and maintaining said valve supports in the valve open position.

10. In a fluid coupling as in claim 9 wherein said annular boot includes spaced annular ends, a boot end being attached to each of said annular portions.

11. In a fluid coupling as in claim 8 wherein said frangible connection means comprises a mounting flange having a tubular hub receiving each body interconnectible end, said flange having an axial dimension no greater than the spacing separating the interconnectible ends of said bodies when interconnected, and a weakened frangible section defined upon said connection means in said hub adjacent said flange adapted to fracture upon predetermined radial shear forces being imposed upon said connection means.

12. In a fluid coupling as in claim 11 wherein said frangible section is defined by a plurality of circumferentially spaced slots defined in said hub adjacent said flange and radially extending through said hub.

13. In a frangible connection for fluid couplings as in claim 5 wherein said first coupling member includes a connection end defined on said circular portion thereof, said second coupling member telescoping over said connection end, and a frangible section defined on said second coupling member in substantial radial alignment with said connection end adapted to shear upon a predetermined radial shear force existing between said first and second coupling members.

14. In a frangible connection for fluid couplings as in claim 13 wherein said frangible section is defined by a plurality of circumferentially spaced slots defined in said second coupling member forming radial webs in said second coupling member.

* * * * *